United States Patent [19]

Scharschmidt et al.

[11] 4,211,800
[45] Jul. 8, 1980

[54] FLAKE CEREAL PROCESS AND PRODUCT

[75] Inventors: Rudolph K. Scharschmidt; Lynn Murphy, both of Battle Creek, Mich.

[73] Assignee: General Foods Corporation, White Plains, N.Y.

[21] Appl. No.: 865,804

[22] Filed: Dec. 30, 1977

Related U.S. Application Data

[63] Continuation-in-part of Ser. No. 749,486, Dec. 10, 1976, abandoned.

[51] Int. Cl.² .............................................. A23L 1/164
[52] U.S. Cl. ........................................ 426/93; 426/99; 426/103; 426/96; 426/302; 426/621
[58] Field of Search ..................... 426/93, 94, 99, 103, 426/303, 310, 621, 452, 457, 466, 302, 331, 96

[56] References Cited

U.S. PATENT DOCUMENTS

| | | | |
|---|---|---|---|
| 1,161,323 | 11/1915 | Martin | 426/621 |
| 1,388,873 | 8/1921 | McKay | 426/457 X |
| 3,484,250 | 12/1969 | Vollink et al. | 426/621 X |
| 3,769,438 | 10/1973 | Rusch et al. | 426/99 |
| 3,840,685 | 10/1974 | Lyall et al. | 426/99 X |
| 3,868,471 | 2/1975 | Decelles et al. | 426/303 |
| 4,013,802 | 3/1977 | Reesman | 426/457 X |
| 4,038,427 | 7/1977 | Martin | 426/93 X |
| 4,075,356 | 2/1978 | Haag et al. | 426/303 X |

*Primary Examiner*—Esther M. Kepplinger
*Attorney, Agent, or Firm*—Daniel J. Donovan; Bruno P. Struzzi

[57] ABSTRACT

Flake cereal product of improved storage stability and enhanced sweetness when sugar coated comprised of prepared cereal flakes coated with an edible oil.

12 Claims, 3 Drawing Figures

FLAKE CEREAL PROCESS AND PRODUCT

This application is a continuation-in-part of U.S. patent application Ser. No. 749,486 filed Dec. 10, 1976, now abandoned.

BACKGROUND OF THE INVENTION

Fats and oils are often incorporated into raw cereal mixes preparatory to toasting. In addition, certain cereal bases, such as corn grits, wheat and oats contain a natural amount of fat, e.g., about 1% in corn grits. The fat content of such cereals, particularly those derived from corn grits, i.e., corn flakes, seriously limits the storage stability to relatively short periods of time, for example 35 days for corn flakes, thus necessitating the incorporation of antioxidants into such cereal products to prolong storage stability. The lack of storage stability is due to the development of rancidity in the cereal. Thus, such cereals now commercially available usually contain artificial additives, i.e., antioxidants, which is not desirable as far as consumer acceptance is concerned.

Commonly, commercial cereal flakes are sugar-coated. Sugar coating of cereals has been accomplished by applying sugar or sugar-containing products directly to the toasted flakes, either in the form of a powder or in aqueous solution followed by further processing to cause the sugar coating to form on the flake surface. In most processes used for this purpose, the resulting sugar-coated product is often excessively brittle. In other cases, the sugar coating becomes highly opaque and masks the cereal product. These disadvantages have resulted in less attractive cereal products which often naturally leads to less consumer acceptance. One attempt to overcome the brittleness problem caused by sugar coatings is the incorporation of edible oils in the sugar solution used for coating. The oil is used to reduce the hardness and brittleness of the sugar coated product. As an alternative, the oil is first applied to the cereal and thereafter the sugar solution is applied. U.S. Pat. Nos. 3,840,685 and 3,959,498 provide an extensive discussion of this art.

Natural, ready-to-eat breakfast cereals and snacks are produced by aggregating particulate cereal grains, primarily comprising oats, using fats and sugar syrups to preserve and agglomerate the cereal particles, using a double or single coating process. Such cereals normally include nutmeats and are prepared by mixing the base grain and nutmeat with the coating material and thereafter drying in tray driers to agglomerated sheets which are finally broken apart to provide uniformly-sized small agglomerates. In applying the coating during this process, the fat can be applied first and the sugar-coating thereafter, or the coating can be effected with a combination of fat and sugar syrup in a single-step coating operation. In one modification of this process, oven-puffed cupped rice flakes are used as one ingredient of the cereal grain mixture, as described in U.S. Pat. No. 4,038,427. The presence of the rice flakes provides a multi-textured lower density and eating quality. Such natural cereals are reputed to be storage-stable because of the high levels of sugar coating normally employed to coat the discrete particles uniformly prior to the aforesaid agglomeration step.

Puffed cereals are well-known and are usually prepared by gun-puffing or by expansion extrusion with simultaneous cutting procedures which are well-known, as described, for example, in U.S. Pat. Nos. 4,051,162; 2,954,295; and 2,954,296. Such puffed products may be prepared in any size and geometric pattern and are characterized by low density and highly porous structures. When fat and sugar-coated, such puffed products are also known to be more stable to rancidity development than uncoated identical products.

Of all of the ready-to-eat cereals, flaked cereals considerably differ from the natural cereals and from the puffed varieties in that they are of different density and an entirely different physical structure. For example, corn flakes are bubbly-surfaced continuous matrices which are highly susceptible to rancidity development, whereas natural cereals are comprised of discrete, small particles which are agglomerated and puffed cereals are low density structures characterized by a high porosity throughout. The present invention is based on the unexpected, high-order stability to rancidity which is imparted to cereal flakes by use of a substantially uniform coating of a fat on the surface of the cereal flake.

SUMMARY OF THE INVENTION

It has now been found that controlled application of certain oils, or fats, to cereal flakes results in a number of desirable advantages, the principal of which relate to improved storage stability, enhanced sweetness when sugar-coated, and improved texture and flavor.

In the following description, the invention will be described with particular reference to corn flakes but it should be understood that the invention is applicable to any cereal flake in which the grain ingredient is principally corn, wheat or oats, all of which have a significant fat content which, heretofore, has necessitated the use of an antioxidant to provide reasonable storage stability of the cereal flakes while packaged. Thus, the grain content may include other grains such as rice which normally does not require the presence of stabilizer for storage stability as well as other grains. However, the grain content of the intended flakes for the purpose of the invention should include an amount of the corn, wheat and/or oats, the fat content of which necessitates the presence of an antioxidant for storage stability. Usually, the flake cereal of the present invention includes at least a major proportion of corn, wheat and/or oats with only minor proportions of other grains present, and in most cases the flakes are composed of said grains at levels of 50% or greater of the grain content, preferably approaching 100%. The new coated flakes of wheat or oats are prepared from flakes of the respective grains, the flakes being made by art-recognized procedures.

Thus, the present invention contemplates cereal flakes the base of which is a grain that is subject to rancidity or off-odor development during storage. The principal cereal grain bases contemplated are corn, wheat and oat but the invention is applicable to any grain base of the said property.

The properties of the new oat and wheat flakes of the present invention are similar to those of the new corn flakes of the invention with specific reference to storage stability, and increased sweetness when coated with sugar. Crispiness retention, flavor enhancement and such properties are comparable to those of the new corn flakes. It will be understood that the processing method to obtain the new wheat and oat flakes from comparable flakes by oil-coating is essentially the same as employed for corn flakes.

DETAILED DESCRIPTION OF THE INVENTION

The present invention provides prepared corn cereal flake products of improved storage stability and unique attributes. Specifically the product exhibits a significantly improved crispness retention in milk, improved texture and enhanced overall flavor and aesthetics.

The new corn cereal products of this invention are comprised of toasted flakes, the surface being coated with certain edible fats at a level of from about 3% to about 10% by weight of the flake. When sugar-coated, these flakes possess an apparent higher sweetness intensity than might be expected from the sugar levels employed, thus permitting the use of lower sugar levels and minimizing the possibly disadvantageous appearance of higher sugar levels and the possibly excessive hardness and brittleness associated with the higher sugar levels.

The storage stability of the present new cereal product is at least comparable to ordinary corn flakes with antioxidants. Thus, with no antioxidant, the present new corn flakes show storage stability of more than 9 months and are believed to be the first naturally storage-stable corn flakes in this context.

The oil-coating step is accomplished in a manner to cause surface-coating of the toasted flakes with a minimum of penetration by the oil into the interior portions of the flakes, so that the oil remains at or near the surface of the flakes and the interior of the flakes remain substantially oil free. Such surface coating has a number of beneficial effects in the corn flakes including definite improvement in taste characteristics, particularly when the flakes are sugar-coated, as well as an apparent higher sweetness intensity than might be expected from the levels of sugar employed. The fat coating, in general, enhances the overall flavor of the cereal product providing a well-balanced level of sweetness and flavor.

Further important effects of the fat coating relate to the texture and shelf-life of the product. The texture improvement is evidenced in crispness retention in milk which is approximately twice that of ordinary corn flakes as determined by expert taste panel testing. Shelf-life improvement is indeed most surprising since apparently the fat-coating extends the shelf-life of the corn flakes so that an antioxidant is not required. On comparison with corn flakes prepared from the same base material and which require and contain an antioxidant, the present new oil-coated corn flakes have demonstrated comparable stability without an antioxidant. Thus, the present new cereal products can be marketed without artificial additives, i.e., antioxidants, if desired.

The preferred toasted corn flakes to be employed in the oil coating process are prepared in a manner to result in a substantially uniform blistering of the surfaces of the flakes since best results are obtained therewith. The preparation of the preferred toasted corn flakes is founded upon the discovery that, when a corn grit is warmed and rendered pliable prior to flaking, a significant improvement in the uniformity of puffing to provide blistering can be realized, provided the grit moisture is uniformly distributed and grits are at a sufficiently elevated temperature to insure the intended effects upon puffing.

One such process involves cooking corn grits, drying the grits to about 12% to about 20% moisture content, preferably conditioning the grits by tempering to uniformly distribute the moisture throughout the grits while maintaining the moisture level at about 9% to about 17% by weight and then rendering the grits pliable, by heating at about 140° to about 200° F., flaking the grits and then toasting the grits to obtain the requisite substantially uniform blistering of the surface.

The process involves conventional treatment of corn grits by the known art processes of cooking, drying to 12 to 20% moisture and tempering the corn grits preparatory to flaking. The dried corn grits are then converted into a condition wherein the moisture content is not only uniformly distributed but also the temperature is elevated to above 140° F. in order to produce a pliable grit preparatory to flaking.

From the detailed description which follows the various methods whereby this condition may be practiced will become more apparent. Generally, it suffices to state that a cooked and partially dried grit is warmed under conditions operative to elevate grit temperature without significantly reducing its moisture content by more than about 3% so that the grit may be flaked under conditions which eventually produce a large number of minute bubbles on opposite faces of the flake as a result of toasting. This art procedure is a reversal of known art processes which have traditionally called for cold tempering or case hardening the partially dried grit to produce a tough exterior wherein moisture at the interior portion of the grain is evenly distributed throughout the grain.

A preferred practice in accordance with this invention also calls for flaking of the pliable grit under conditions which do not produce a ribboning in the resulting flake and rather instead produces a substantially flat flake. It will be understood that corn has an "elastic memory" and, in any event, a native elasticity which can result in contraction and exaggerated curling after a corn grit has been flaked.

After flaking, heat is applied to the flattened corn flake at a sufficient rate to assure that the flake substantially sets in its distended condition collateral to development of blisters which quickly form upon elevation of flake temperature in the heating zone of a toasting oven. Thus, the flattened flake is toasted under conditions which initially tend to set the configuration of the flake while providing blistering thereto and whereafter the flake is eventually dried and toasted to perfect the uniform blistered condition just specified. It should be recognized that some degree of surface curling occurs from time to time but not of the kind manifested by products of conventional processes. The final toasted flake assumes what can be referred to as a semi-curled configuration in that the curling is not as pronounced as obtained in conventional toasting procedures. The resulting toasted corn flake is ideally suited for the application of a hot fat, or oil, in a manner that results in surface coating of the flakes.

The oil-coating step can be accomplished by any art-recognized procedure for application of an oil to a substrate, as long as the oil is applied at a level of from about 3% to about 10% based on the weight of the toasted corn flakes. A preferred method involves spraying the oil preferably at about 100°–180° F. at the determined level while agitating the mass of toasted corn flakes to promote uniform surface coating of the flakes. The flakes should be at a product temperature of about 100° F. but not above about 150° F. since higher temperatures promote impregnation by the oil. For this purpose, a heated cylindrical-type coating reel is advantageous when used in cooperation with a pressurized spray gun. The toasted corn flakes are fed into the heated reel and the oil applied while hot with the spray gun. Uniform distribution of the oil on the corn flake surface is assured by continuing tumbling of the corn flake in the reel after application of the oil is completed.

As indicated, the oil is preferably applied at elevated temperature so that it is sufficiently fluid for spraying purpose and the corn flakes are also heated to encourage substantially even distribution of the oil along the surfaces thereof. The selection of temperatures is normally predicated on convenience as well as the nature of the oil, that is, fat, employed. Excessively high temperatures result in impregnation of the flakes and should therefore be avoided. For most purposes, the reel temperature is maintained in the range of from about 195° to about 350° F., the oil used for spraying in the range of from about 100° to about 180° F., and the corn flake product temperature at about 100° to 120° F. Of course, temperatures at which the oil undergoes decomposition are to be avoided.

After oil coating, the corn flakes may then be sugar-coated using art-recognized techniques. For example, a coating syrup comprising sugar in water can be employed for this purpose. Preferably, the coating syrup comprises brown sugar with minor amounts, e.g., about 10% by weight of the sugar, of honey which appears to provide excellent results.

The amount of sugar required for sweetness is significantly less than that normally employed with corn flakes lacking an oil coating in accordance with the present invention. This lessened amount of sugar is in part attributable to a more uniformly and effectively distributed coating of the sugar on the oil-coated, substantially uniformly blistered surface of the corn flakes. The resultant corn flakes are characteristically neither frosted in appearance nor glossy and are not suggestive of so-called high sugar-coated breakfast cereal products. Advantageously such a sweetened product has a more universal appeal and a sweetness profile appealing to various age groups other than juveniles.

The amounts of sugar normally employed in sweetened cereal products usually ranges above about 40% by weight whereas, in the present new oil-coated corn flakes, the sugar requirements are less than about 30% by weight of the cereal product and usually greater than about 15% by weight.

The product is distinctly tender, yet crisp, and retains crispiness both in package and when wetted in milk or cream. The oil employed in the present new corn flakes cereal product is any edible glyceride ester of an iodine number of not greater than 25, and preferably less than about 15. Iodine number, of course, is a commonly employed measure of unsaturation in glyceride fats, the number being defined as the number of grams of iodine taken up by 100 grams of fat.

Thus, the selected oil can be a naturally-occurring oil, or fat, or alternatively a hydrogenated natural oil with the necessary iodine number, i.e., a natural glyceride oil which is hydrogenated until the iodine number is less than 25. Desirably, the selected oil should not detract from the taste characteristics of the finished cereal product and is preferably bland, leaving no after-taste in the consumer's mouth. Additionally, the oil should melt rapidly in the mouth of the consumer.

A variety of oils are readily available in commercial quantities and are commonly used in the food industry. Thus, coconut oil, vegetable oils and palm kernal oil can be employed in the present invention as well as a variety of other oils which suggest themselves to those skilled in the art.

As hereinbefore indicated, the amount of oil employed will be in the range of from about 3% to about 10% by weight of the corn flakes, with from about 4% to about 6% by weight being preferred.

The preferred oil-coated corn flake product of this invention is characterized by a substantially uniform, evenly distributed coating of oil on the surface portions of the flakes, the latter being further characterized by a substantially uniformly-blistered surface. The extent of penetration of the applied oil coating is about 10%, with the internal portions, i.e., the matrix, of the flake remaining substantially oil-free. In certain instances, the cavities formed by the surface blistering become oil-coated whereas other such cavities remain oil-free. It is presumed that oil will penetrate some cavities which are open due to discontinuous surface of the blister whereas other blisters with continuous surface are not so penetrated.

DESCRIPTION OF THE DRAWINGS

Referring to FIG. 1, the cross-sectional view of the uncoated corn flake shows the cavities, or vacuoles, which are formed in the matrix of the flake by the toasting step, i.e., the blistering of the flake surface. These cavities are surrounded by the matrix of the flake, the gross surface of which is crenulated, the micro appearance of which is striated.

Referring to FIG. 2 there is depicted the cross-section of a flake similar to that of FIG. 1 as to the base flake structure but also showing the frosting-like glazed coating of oil, i.e., coconut oil, which does not appreciably penetrate the flake matrix. The cavity on the left is uniformly surface-coated with oil whereas the cavity on the right shows no oil coating. As is clear from FIG. 2, the fat-coating is continuous on the flake surface.

Figure 1:
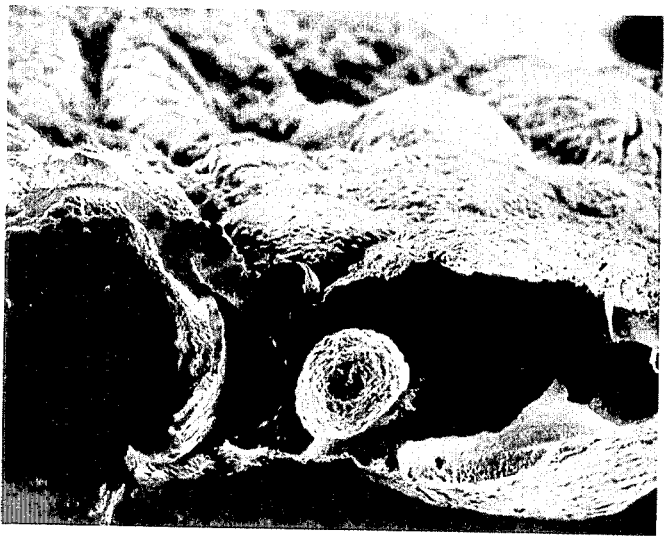
FIG. 1 is a photomicrograph taken at a 100× magnification of a cross-section of corn flake of substantially uniformly blistered surface.
Figure 2:
FIG. 2 is a photomicrograph taken at a 100× magnification of a cross-section of corn flake similar to that of FIG. 1 but with oil coating.

When sugar coating is applied to a fat-coated flake as depicted in FIG. 2, the surface of the flake tends to lose its glossy appearance and becomes amorphous. No penetration of the flake by the sugar apparently takes place and the fat and sugar coating remains as a continuous coating on the surface of the flake as shown in FIG. 3.

Figure 3:
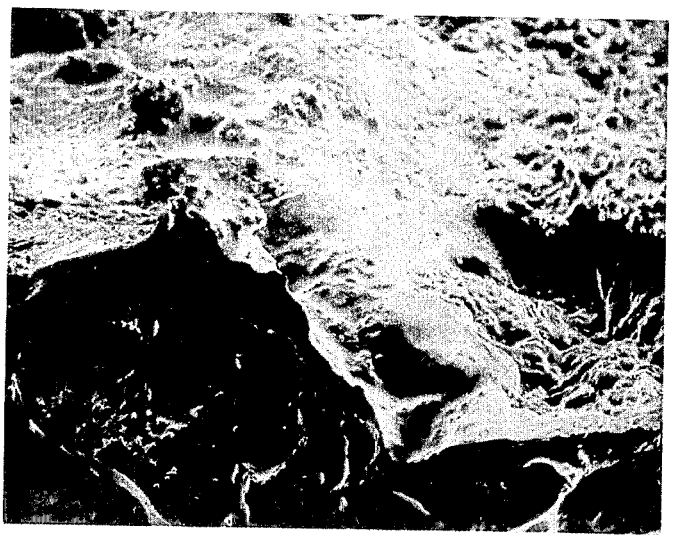
FIG. 3 is a photomicrograph taken at a 100× magnification of a cross-section of a corn flake similar to that of FIG. 2 but with a sugar coating.

The sugar and fat-coated flake of FIG. 3 is no more storage stable than the fat-coated flake of FIG. 2. from which it is obvious that the sugar coating plays no significant role in enhancing storage stability of the corn flake products of this invention.

A number of procedures may be used to achieve the aforestated pliable hot tempered corn grit. One such procedure is that set forth in copending application U.S. Ser. No. 579,355 filed May 21, 1975 (now U.S. Pat. No. 4,013,802) by Reesman for Corn Flake Process and Product. This procedure calls for treating cooked partially dried and tempered or cured corn grits in such a manner that the grit temperature is elevated to above 140° F. by use of a hot humid atmosphere just prior to flaking the grit. This practice typically may employ the first stage of a cabinet dryer with appropriate regulation of dry and wet bulb thermometry conditions such as assures a minimal reduction in the initial moisture content, which initial moisture content ideally should be between 15 and 17%. Details of this particular procedure are given in Example 1 which accompanies this specification.

However, the invention is not restricted to the use of corn flakes prepared by particular embodiment since other means have been found which produce like results. Thus, corn grits which have been partially dried after cooking and tempered can be simply warmed to the stated temperature range of 140° to 200° F. in a confined zone whereby the product charge in say a thick bed or in a confined collected container such as a feedhopper is caused to seek its own humidity without substantial dehydration while achieving the temperature elevation required for pliability. This alternative is shown in Example 2. Example 3 shows still another means of achieving the same result.

In the preferred embodiment of this invention wherein corn flakes of substantially evenly blistered surface are substantially uniformly coated with the specified fat, the stability data indicate that such corn flakes have even greater storage stability than uncoated corn flakes in the presence of antioxidant in accordance with the prior art. Thus, the preferred corn flakes of the invention show longer storage stability than identical but uncoated corn flakes stabilized with antioxidants which is an unobvious and unexpected advantage of the present invention.

Generally, other flake cereal products such as corn flakes in which the surface is not substantially evenly blistered, wheat flakes and oat flakes when oil-coated in accordance with the invention show storage stability which is at least comparable to otherwise identical but uncoated flakes stabilized with antioxidant, as is shown in the following examples which further illustrate the invention.

EXAMPLE 1

Raw, sized corn grits between 4 and 10 mesh, U.S. Standard are cooked at 18 psig for 3 hours in a pressurized, rotating steam cooker. The cooking flavoring syrup consists of sufficient quantities of water, sugar, salt brine, corn syrup, malt syrup, and ferrous sulfate to produce a fully cooked soft, pliable cereal of 30% to 35% moisture. The lumped, cooked corn grits are broken apart and then dried for three hours in a vertical dryer to a moisture of 16 to 20%. The grits are then tempered for 3 to 7 hours where the grit moisture is allowed to stabilize throughout the individual grits.

Then 20 lbs. of the grits are placed on a screened tray with an approximate 1/16" square mesh and dimensions of 3 ft. long × 2 ft. wide × 3 inches deep and heated in a forced air, gas fired, humidity controlled cabinet dryer. The dryer settings are 200° F. dry bulb, 175° F. wet bulb or approximately 50% relative humidity and the retention time is about two minutes.

The temperature of the grits before entering the cabinet dryer is about 100° F. and the temperature of the grits after this hot humid air treatment is 152° F., ±5° F. This hot humid air preheating of the grits causes no substantial change or losses in the grit moisture. The result is a plasticization of the previously dried and tempered grit.

These preheated grits, in this hot, pliable condition, are dumped into flaking roll feedhoppers that accumulate approximately 250 lbs. of the product and retains it 40 to 45 minutes prior to flaking. The grits are flaked on conventional flaking rolls at a rate of 280 to 320 lbs./hour and a flake thickness of 0.012 to 0.026 inches and preferably 0.018 inches. The flakes are then gravity fed from the rolls to a conventional rotating, gas fired toasting oven. The oven is 19.5 ft. long with a diameter of 3 ft. and rotating at 25–30 rpm's with an interior temperature of approximately 550° F. The flake produced is a toasted crisp, well-blistered product of 2% moisture. The resulting flakes are semi-curled and have a well-blistered surface and when consumed in milk will remain desirably crisp for a period of about four minutes.

The toasted flakes are then cooled to ambient temperature on a forced air cooling screen (room temperature 70°–80° F. air), and then subjected to the coating process.

The coating syrup is prepared by mixing 34 lbs. of brown sugar and 3.3 lbs. of honey in 16 lbs. of water. The syrup is then heated to 150° F. in a 200-gal. steam jacketed kettle with an attached mixer providing agitation to produce a coating syrup solution of 69° Brix.

The coating formula consists of 8.2 lbs. toasted flakes, 209 grams pure coconut oil and 3.4 lbs. of coating syrup.

The toasted base flakes are preheated on trays (8.20 lbs/tray) in an electrically heated cabinet dryer at 225° F. for 5 minutes. The flakes were then placed into a heated cylindrical type coating reel rotating at 20 rpm's and with a reel temperature ranging from 195° F. to 350° F. and preferably 250° F. Pure coconut oil (melting point 75°–78° F.) at 150° F. was sprayed onto the flakes in the rotating reel through a pressurized spray gun. This spray application requires approximately 30 to 40 seconds and the resulting oil-coated flakes are allowed to tumble in the reel 30–40 seconds thereafter to allow uniform distribution and surface-coating by the oil. The oil-coated lubricious flakes are then coated with the coating syrup at 150°–240° F. which may be sprayed onto the flakes through the pressurized spray gun or, if preferred, it may also be poured onto the flakes.

After this syrup coating is applied, the coated product is allowed to tumble in the reel an additional three minutes to again insure uniform distribution and surface-coating of the flakes by the coatings and also to allow for some small moisture evaporation and/or sugar crystallization preparatory to drying. Following the coating, the entire coated batch is dumped from the reel and leveled onto one of the aforementioned screen trays. This tray with a product bed depth of 2 to 3 inches, is then placed into a forced air, electric cabinet dryer and dried at 250° F. for 15 minutes. Thereafter, the product was cooled to ambient temperatures and eventually packaged. The product thus produced is a sugar coated flake having a density of approximately 150 gms ±20 gms per liter. The product when consumed in milk, remained desirably crisp with excellent flavor and appearance.

EXAMPLE 2

The cooked corn grits which have undergone the cooking, drying and tempering need not be humidified and heated as exemplified in Example 1, but rather they may be charged onto a continuous belt-type dryer. The dryer may be either a single moving belt or a multipass traveling screen belt type dryer. With the single moving belt dryer, the grits were preheated at 220° F. a retention time of 5 minutes, a rate of 1200 lbs. per hour, and a bed depth of approximately 2 inches. With the multipass dryer, the grits were preheated at a temperature of 230° F., a retention time of 10 minutes, a rate of 1200 lbs. per hour, and a bed depth of one inch.

The resulting decrease in moisture caused by preheating in either dryer is less than 3% while the increase in the temperature of the grits is from the initial 100° F. to 150° F. The heated grits are then dumped into the flaking roll feedhopper and treated thereafter as that of Example 1, including the coating process. The finished product exhibits the identical characteristics of the product produced in Example 1.

EXAMPLE 3

Example 1 is repeated, but the grits are not preheated in a humid cabinet dryer but rather in a fluid bed, high temperature, low retention time dryer. The product rate through the dryer is 1200 lbs. of grits per hour. The initial grit temperature, 70°±5° F., and the preheated grit temperature, 150°±5° F. The loss in moisture after preheating is less than 3%. The grits are collected in plastic lined fiber drums and then dumped into the flaking roll feedhopper and treated thereafter as that of Example 1, including the coating process. The finished product again exhibits identical characteristics compared to product produced in Example 1.

EXAMPLE 4

Uncoated corn flakes prepared in accordance with the procedure of Example 1 are coated with the following coatings:

| Sample # | Coating |
|---|---|
| 1 | White sugar/honey (no fat). |
| 2 | Brown sugar/honey (no fat). |
| 3 | White sugar/honey and Konut oil. |
| 4 | Brown sugar/honey and Konut oil. |
| 5 | Konut oil only. |
| 6 | Wecotop A oil only. |
| 7 | Brown sugar/honey and Wecotop A oil. |
| 8 | Brown sugar/honey and Duratex oil. |
| 9 | Corn oil only. |
| 10 | Brown sugar/honey and corn oil. |
| 11 | Peanut oil only. |
| 12 | Brown sugar/honey and Peanut oil. |
| 13 | Regular Base Post Toasties Flakes |

The coating procedure used is described in Example 1. In every instance, the fat coating is applied first. Konut oil—coconut oil (Durkee Famous Foods, Cleveland, Ohio.) Wecotop A oil—a blend of hardened lauric oils, Iodine No.=5,—PVO International, Inc., St. Louis, Mo. Duratex Hydrogenated Cotton Seed Oil—a blend of solid fats Iodine No.=5,—Durkee Famous Foods, Cleveland, Ohio.

Each of the samples on analysis give the following results:

| Sample | % H$_2$O | Total Sugar | Invert | % Fat |
|---|---|---|---|---|
| 1 | 1.97 | 26.60 | 4.64 | 0.50 |
| 2 | 2.69 | 27.40 | 5.54 | 0.28 |
| 3 | 2.06 | 27.40 | 4.84 | 4.82 |
| 4 | 1.66 | 25.00 | 4.92 | 4.80 |
| 5 | 2.19 | 9.00 | 4.36 | 5.26 |
| 6 | 2.07 | 9.00 | 4.12 | 5.54 |
| 7 | 2.49 | 25.40 | 4.96 | 3.99 |
| 8 | 2.17 | 26.80 | 5.00 | 3.54 |
| 9 | 1.13 | 9.00 | 4.08 | 5.38 |
| 10 | 1.94 | 26.80 | 5.16 | 3.80 |
| 11 | 1.64 | 9.00 | 4.28 | 5.35 |
| 12 | 2.04 | 26.60 | 5.20 | 4.11 |
| 13 | 2.25 | 9.00 | 4.40 | 0.23 |

The total sugar content includes the natural sugar content of the corn flakes and where appropriate the added sugar, as is the case for the fat content.

The samples are stored in a room maintained at 145° F. and the samples are checked at periodic intervals for change, in particular the development of rancidity. Only samples 3–8 showed stability for about 5 weeks whereas the remaining samples became rancid at the end of one week. Some borderline rancidity is detected with Sample 5 after 4 weeks of storage.

Of course, corn oil and peanut oil are highly unsaturated fats. The results with samples 1 and 2 show no improved stability, nor do the sugar coatings of Samples 3, 4, 7 and 8 add to the stability of corresponding flakes coated with oil only.

When these stability tests were repeated at 113° F. in lieu of 145° F., the results showed long term stability for the Example 1 product for an average of at least about 140° days, i.e., no rancidity was detected after about 140 days.

Field storage tests with the Example 1 product showed an average stability to rancidity development of about 12 months.

EXAMPLE 5

The present new cereal product (Sample A) is compared with commercial products: Post Toasties (Sample B), Kelloggs' Corn Flakes (Sample C), and Kelloggs' Sugar Frosted Flakes (Sample D) with the results given in Table I.

TABLE I

| Sample | Density Gm/l[4] | Average Flake Thickness[5] | CI Density Oz/Cu.In. | Time/Texture Crispness in Milk (Minutes) |
|---|---|---|---|---|
| A | 145 | .025 | .085 | 4.5[2] |
| B | 86 | .014 | .059[1] | 2.6[2] |
| C | 102 | .017 | .060[1] | —[3] |
| D | 148 | —[3] | .088[1] | —[3] |

[1]As reported in the Cereal Survey Index - January 1975.
[2]Based on averaging the time reported by 12 taste panelists.
[3]Not determined.
[4]With sugar coating.
[5]Without sugar coating.

EXAMPLE 6

Various cereal flakes were coated with oil using the coating procedure of Example 1. Samples of the thus-coated flakes were then evaluated as to storage stability employing standard procedures. The two procedures employed involved the "Jar Test" and "Package Test". The Jar Test involves storing samples of the cereal flakes in a closed jar at a fixed temperature, here 113° F., to simulate storage conditions whereas in the Package Test the cereal flakes are packaged in the form normally sold to the public, i.e., in a liner packaged in a box, and these packages are stored at constant temperature to simulate storage conditions, here 113° F.

Periodically, the samples of flakes are inspected to determine the development of rancidity which, in these tests, is detected by smell. The results are given in the following tabulated data.

In the Jar Tests, where antioxidant is indicated, it is normally incorporated in the form of a piece of the liner material containing antioxidant. Sufficient liner material is used to provide about 581 ppm of antioxidant (BHA) in the liner material which generally provides to the flakes about 8 ppm of antioxidant by transfer.

TABLE II

JAR TESTS

| Flake Cereal Base | Coating Fat (%) | BHA | Days to Rancidity |
|---|---|---|---|
| Corn | 0 | No | 21 |
| (Post Toasties) | 0 | Yes | 61 |
| | 3 | No | 61 |
| | 5 | No | None after 99 days |
| Oat (with less | 0 | No | 78 |
| than 5% Wheat) | 0 | Yes | 99 |
| (Fortified Oat Flakes) | 3 | No | 99 |
| | 5 | No | 99 |
| 25% Bran | 0 | No | 61 |
| 75% Wheat | 0 | Yes | 99 |
| (Post 40% Bran Flakes) | 3 | No | 78 |
| | 5 | No | 78 |
| Wheat | 0 | No | 35 |
| (Grape Nuts Flakes) | 0 | Yes | 39 |
| | 3 | No | 97 |
| | 5 | No | 97 |

In the package test, BHA is incorporated in the package liner and the antioxidant transfers to the flakes.

PACKAGE TESTS

| Flake Cereal Base | Coating Fat (%) | BHA | Days to Rancidity |
|---|---|---|---|
| Wheat | 0 | Yes | 42 |
| (Grape Nuts Flakes) | 3 | No | 97 |
| | 5 | No | 97 |

Thus, these test data clearly demonstrate that the preferred coated corn flakes are substantially more stable to rancidity development than are similarly treated corn flakes which do not characteristically have a substantially uniformly blistered surface (Post Toasties in Example 6) and are more stable than such corn flakes stabilized with BHA, even with oil coating in accordance with the invention.

Heretofore, flaked cereal products have been packaged with added stabilizer to prolong storage stability of the product. Common stabilizers employed for this purpose include BHA (butylated hydroxyanisole) and BHT (butylated hydroxytoluene).

The oil-coated cereal flakes of this invention can be packaged in units of the usual packaging materials but without the heretofore necessary antioxidants being present. The packaged cereals are of stability to rancidity development, at least comparable to that realized with otherwise identical cereal flakes with added stabilizer. Thus, the package of cereal comprising flakes coated with oil in accordance with the present invention does not require added stabilizer for normal storage stability. If desired, however, stabilizers normally employed in cereal packages can be added.

Accordingly, the present new products can be packaged in the usual type of packaging employed for flake products, e.g., cardboard or pressed paper exterior container with a sealed inner liner, usually wax coated on the internal face of the liner. Alternatively, the present new products can be packaged in food-acceptable plastic containers, e.g., comprised of films of polyalkylenes such as polyethylene, heat-sealed to protect against the environment. The form of packaging is not critical and will be dictated by marketing and sale requirements, for the most part. Such unit packages as contain the oil-coated products of this invention, however, are characterized by the fact that no added stabilizer is required to provide the usual prolongation of stability to rancidity development.

What is claimed is:

1. A package of cereal flake product of improved storage stability without added stabilizers consisting of toasted cereal flakes substantially uniformly coated with an edible fat at a level of from about 3% to about 10% by weight of said flake, said fat having an iodine number of less than about 25, the matrix of said flake being substantially free of added fat.

2. A cereal product according to claim 1, wherein said flakes comprise corn, wheat or oats.

3. A cereal product according to claim 1, wherein said fat is coconut or palm kernel oil.

4. A prepared corn cereal product of improved storage stability without added stabilizers comprised of toasted flakes of substantially uniformly blistered surface, said surface being substantially uniformly coated with an edible fat at a level of from about 3% to about 10by weight of said flake, said fat having an iodine number of less than about 25.

5. Cereal product according to claim 4, wherein said iodine number is less than about 15.

6. Cereal product according to claim 4 which is sugar coated.

7. A prepared corn cereal product of improved storage stability without added stabilizers in the form of toasted flakes of substantially uniformly blistered surface, said surface being substantially uniformly coated with coconut or palm kernel oil at a level of about 3% to about 10% by weight of said flake.

8. Cereal product according to claim 7, wherein said level of said fat is from about 4% to about 6% by weight.

9. A sugar-coated corn cereal product of improved storage stability without added stabilizers comprised of toasted flakes of substantially uniformly blistered surface, said surface being substantially uniformly coated with an edible fat at a level of from about 3% to about 10% by weight of said flake, said fat having an iodine number of less than about 25, the coating sugar being present at a level of from about 15% to about 25% by weight of said cereal product.

10. Cereal product according to claim 9, wherein said fat has an iodine number of less than 15.

11. Cereal product according to claim 9, wherein said level of said fat is from about 4% to about 6% by weight.

12. Prepared corn cereal flakes having substantially uniformly blistered a surface comprising a coating of an edible fat at a level of from about 3% to about 10by weight of said flake, said fat having an iodine number of less than about 25, substantially as depicted in FIGS. 2 and 3.

* * * * *

UNITED STATES PATENT AND TRADEMARK OFFICE
CERTIFICATE OF CORRECTION

PATENT NO. : 4,211,800
DATED : July 8, 1980
INVENTOR(S) : R. K. Scharschmidt et al.

It is certified that error appears in the above-identified patent and that said Letters Patent are hereby corrected as shown below:

In the Claims:

Claim 4, line 6, change "10by" to -- 10% by --.

Claim 12, line 1, before "substantially" insert -- a --; line 2, delete "a", first occurrence; line 3, change "10by" to -- 10% -- .

Signed and Sealed this

Twenty-fourth Day of November 1981

[SEAL]

Attest:

GERALD J. MOSSINGHOFF

Attesting Officer

Commissioner of Patents and Trademarks